United States Patent [19]

Tilney

[11] Patent Number: 4,689,019
[45] Date of Patent: Aug. 25, 1987

[54] FOOD EXCHANGES KIT, AND METHODS OF CONSTRUCTING AND UTILIZING SAME

[76] Inventor: Catherine Tilney, 16930 Josephine, Fraser, Mich. 48026

[21] Appl. No.: 696,116

[22] Filed: Jan. 29, 1985

[51] Int. Cl.⁴ .............................................. G09B 1/06
[52] U.S. Cl. ...................................... 434/127; 40/594
[58] Field of Search .......................... 434/127; 428/42; 40/2 R, 594

[56] References Cited

U.S. PATENT DOCUMENTS

| | | | |
|---|---|---|---|
| 2,314,387 | 3/1943 | Carlsson | 434/127 |
| 2,337,594 | 12/1943 | Easley | 434/127 |
| 2,391,539 | 12/1945 | Avery | 40/2 R X |
| 3,460,281 | 8/1969 | Levy | 40/489 |
| 4,310,316 | 1/1982 | Thomann | 434/127 |
| 4,460,179 | 7/1984 | Hafer | 434/127 X |

Primary Examiner—William H. Grieb
Attorney, Agent, or Firm—Brooks & Kushman

[57] ABSTRACT

A method and a kit of components for implementing a diet using color-ordinated food exchange cards to match foods of the major food groups in a food exchange list. Self-adhesive labels printed with various meal designations are provided for affixing to the food exchange cards. Other blank labels for writing special instructions are also provided for affixation to the food exchange cards. Each card represents one food exchange and is color co-ordinated to match the colors of the various food groups found in the American Diabetic Association booket entitled EXCHANGE LISTS FOR MEAL PLANNING.

20 Claims, 4 Drawing Figures

FOOD EXCHANGES KIT, AND METHODS OF CONSTRUCTING AND UTILIZING SAME

BACKGROUND OF THE INVENTION

1. Field of the Invention

The present invention relates generally to a method and a kit of components for implementing a predetermined diet. More particularly, the present invention relates to a kit of components for simplifying the implementation of a system of diabetes control through diet.

In order to understand the importance of the present invention, an understanding of the underlying medical reasons may be helpful. Very simply put, any treatment and control of diabetes includes: 1. diet; 2. diet with oral medication; and/or 3. diet with insulin injections, which always are given on a daily basis. It is important to note from the foregoing that diet is an important factor in all of the various treatments enumerated.

Various caloric diets (ranging from 1,000 calories to 2,800 calories) have been prepared by the American Diabetic Association (ADA) and are used to treat diabetics. Although the ADA diet is a weight reducing diet in many cases, this is not necessarily so. Primarily, the ADA diet is a method of treating and controlling diabetes, and must be a day to day consistency of ratios of carbohydrate, protein and fat for each feeding. Once a certain caloric ADA diet is established for a particular patient in order to control the blood sugar within normal limits, it is a life time treatment. It must be adhered to without deviation for life.

Each ADA diet is individualized by physician prescription, and can only be changed by the physician. A patient must schedule his or her meals to provide regular caloric intake. Meal planning is necessary to avoid alternating periods of feasting and fasting, resulting in too high or too low blood sugar levels. The amount of meals ranges from 3 to 8 meals per day.

One approach to diabetic dietary management involves a system of food exchanges which can provide menu variety while maintaining consistent distribution of daily caloric intake. The exchange list system involves the grouping of foods with similar fat, carbohydrate and protein content into lists allowing the exchange of a portion of one food on a list with another on the same list while composing a menu. An exchange list system has been prepared by a committee of the American Diabetic Association and the American Dietetic Association in cooperation with National Institute of Health which exchange list system was published in 1976. While the lists assist in controlling total calories, and provide information concerning the amount and type of fat present in various foods, the varieties of foods listed are, of necessity, quite limited.

Furthermore, the exchange lists method is somewhat difficult to understand and complicated to use. The foregoing factors coupled with the overwhelming nature of the patient's disease and treatment, results in the patient following the line of least resistance which results in non-adherence to the patient's prescribed diet. This non-adherence to the prescribed diet is a very critical factor in view of the fact the non-compliance with a diabetic diet is very often life-threatening.

In order to urge and help the patient to adhere to his or her diet by using exchange lists, the patient has to understand the lists and how to use them. This is the problem addressed by the present invention. The present invention provides a simple kit of components and a simple method to assist in understanding and using exchange lists.

All foods on a ADA diet must be eaten, and also foods designated to be eaten at one meal must be eaten at the meal and at no other time. No foods or meals must be "skipped." It is difficult for a diabetic to use this method of disease control. It is also difficult for the diabetic to understand and use the ADA exchange lists of foods allowed. But the most important aspect is that if the diabetic does not adhere to his or her ADA diet in the manner mentioned above, it could very often is life-threatening.

Accordingly, the primary reason for the present invention is to help the diabetic understand and use the ADA diet and exchange lists, and to promote 100% compliance with the prescribed diet, thus keeping the blood sugar level under control.

When a diabetic's blood sugar level is out of control, symptoms are severe enough to require hospitalization. While the diabetic is in the hospital, the ADA diet is ajdusted in an effort to keep the blood sugar level at a desired level. Additionally, medication doses (if any) are also adjusted. When the desired blood sugar level is achieved, the patient is sent home with an individualized ADA diet and lists of exchange foods which the patient may eat. This is where the problem arises. Very frequently, the patient has difficulty in understanding and using the prescribed ADA diet and exchange lists. It has been found that the diabetic patient requires a simple, effective way in order to adhere to his or her prescribed diet at home and also when eating away from home. Prior techniques and systems do not accomplished the desired result.

2. Description of Relevant Art

The relevant art is exemplified by the three patents discussed hereinbelow.

U.S. Pat. No. 2,314,387 issued in 1943 to Carlsson entitled BALANCED DIET SELECTING APPARATUS discloses the provision of a balancing support in the nature of a see-saw or teether board fulcrumed centrally. An example card is mountable on the board at one end thereof and has illustrated thereon the elements of at least one balanced diet meal. Selective blocks of different weights each having illustrated thereon an element of a meal, are adapted to be placed on the other end of the board. The relation of the illustrations on the blocks to their respective weights is such that if blocks together illustrating a balanced diet meal or meals are placed on the board in a single layer and respectively on predetermined board areas the weights on opposite sides of the fulcrum will be equal and the board, once placed in a horizontal position, will remain in such position. On the other hand, if the blocks placed on the board collectively illustrate an improperly balanced diet meal or meals, then the weights on opposite sides of the fulcrum will be unequal and the board will tip from the horizontal position.

U.S. Pat. No. 2,337,594 issued in 1943 to Easley entitled MENU CARD DECK discloses a deck of cards, the different cards of which are so constructed that by selecting a group of cards and stacking them, a complete well balanced menu will be contained in exposed indicia of the different stacked cards. The first of the cards has an opening therein, the second of the cards being disposed behind the first card and having a portion crossing and observable through the opening. The second card has an opening registrable with the opening in the first card, and the third card is disposed behind the second card and has a portion crossing observable through both the opening in the first and second card.

U.S. Pat. No. 4,310,316 issued in 1982 to Thomann entitled DIET CONTROL APPARATUS discloses a diet control means having lists of various food categories with each of such categories, in turn, listing specific items of food and their respective quantities thereof which constitute what may be referred to as obtainable with a single ticket. There is provided a plurality of containers corresponding to the number of meals to be eaten during a twenty-four hour period, and these containers contain a plurality of tickets which are, in turn, redeemable for obtaining a quantity of dieter-selected specific food items within the food category designated by the respective ticket. As the tickets are redeemed during the twenty-four hour period, the tickets are considered spent and placed within a container for the collection thereof.

SUMMARY OF THE INVENTION

The present invention provides a method and a kit of components for implementing a predetermined diet, comprising a first plurality of cards each of which represents one food exchange in a particular one of the major food groups. The kit of components also includes a second plurality of pre-printed self-adhesive labels corresponding to various meals for application to certain ones of the first plurality of food exchange cards in accordance with the predetermined diet. The kit of components further contains a third plurality of blank self-adhesive labels to be marked by the user with special instructions for application to certain ones of the first plurality of food exchange cards in accordance with the predetermined diet.

It is an object of the present invention to provide a kit of components, a method of utilizing same, and a plan to simplify understanding and use of a complicated system of diabetes control through diet.

Another object of the invention is to provide a kit of components and a method which is medically oriented to control a disease, which is not necessarily being overweight, and which uses a consistent distribution of daily calories.

A further object of the invention is to provide a kit and a method as mentioned hereinabove wherein the cards are color coded to correspond to internationally recognized colors of major food groups.

Another object of the invention is to provide a kit and a method as mentioned hereinabove wherein the cards are dimensioned for transporting in a shirt pocket or in a purse.

Yet another object of the invention is to provide a kit and method as mentioned hereinabove wherein the kit and method is individualized according to a diet prescribed by a physician.

Other object, details and features of the present invention will become apparent from the following detailed description of preferred embodiments thereof.

DETAILED DESCRIPTION OF PREFERRED EMBODIMENTS

Figure 1:
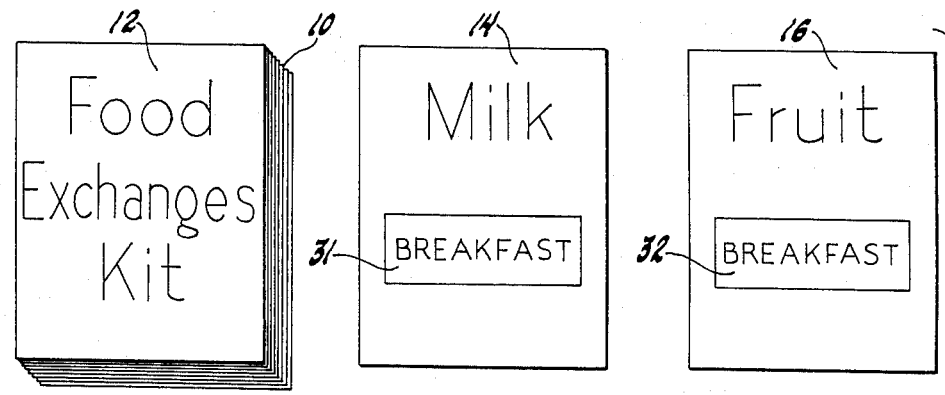
FIG. 1 illustrates a perspective view of the stack of 33 food exchange cards with the face card shown on top thereof.

With reference to FIG. 1, there is shown the stack 10 of the food exchange cards which form part of the kit of components in accordance with the present invention. The stack 10 represents the first plurality of cards each of which corresponds to one food exchange in a particular one of the major food groups.

Figure 3:
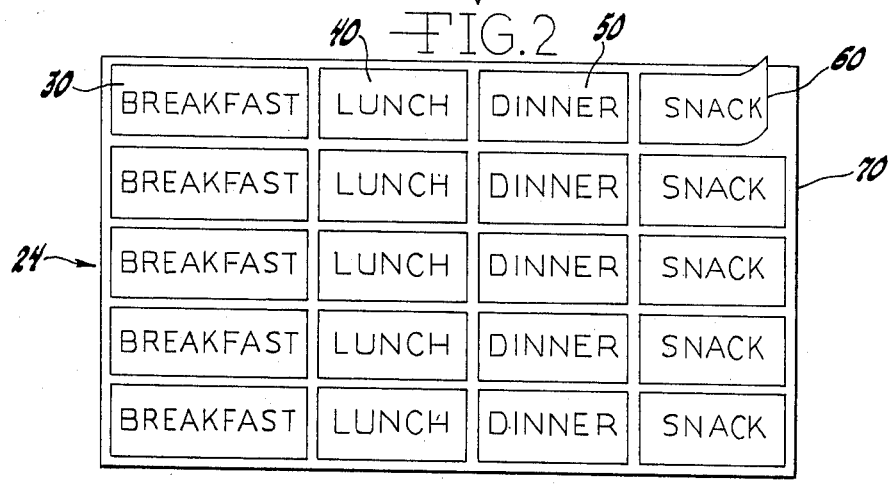
FIG. 3 illustrates a typical set of pre-printed self-adhesive labels forming a part of the kit of components in accordance with the invention.
Figure 4:
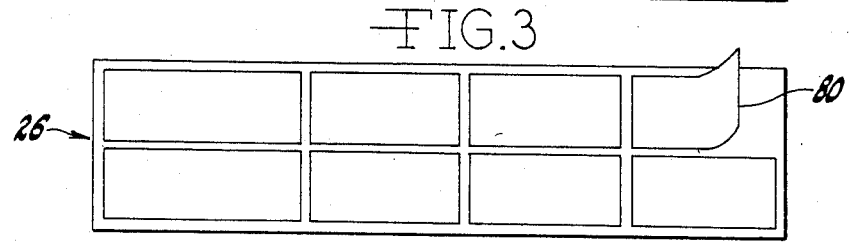
FIG. 4 illustrates a typical set of blank self-adhesive labels forming another part of the kit of components according to the present invention.

In accordance with a preferred embodiment of the present invention, a kit of components would include thirty-three food exchange cards 10, thirty-five pre-printed self-adhesive labels 24, some of which are illustrated in FIG. 3, a set of fourteen blank self-adhesive labels 26, some of which are illustrated in FIG. 4, instructions, and general information.

The thirty-three food exchange cards 10 would include a face card 12, three blue cards 14 each marked in large readable letters with the designation MILK, three green cards (not shown) each marked in large readable letters with the designation VEGGIES to denote "vegetables", five orange cards 16 each marked in large readable letters with the designation FRUIT, eight brown cards 18 each marked in large readable letters with the designation BREAD, five yellow cards 20 each marked in large readable letters with the designation FAT, and eight red cards 22 each marked in large readable letters with the designation MEAT. Milk, vegetables, fruit, bread, fat, and meat denote the major food groups comprised from the ADA diet. Each of the cards 10 is preferably, but not necessarily, 2½" by 3½" (playing card size) to fit in a man's shirt pocket for taking with him when eating out, and for familiarity of handling. Each card 10 is color-coded to correspond to the internationally recognized colors of food groups: meat-red; milk-blue; fat-yellow; vegetable-green; fruit-orange; and bread-brown. Each card 10 is made of plastic heavy paper or cardboard material to permit the self-adhesive labels 24 and/or 26 to be easily placed, removed and replaced therefrom.

In accordance with a preferred embodiment of the present invention, there would be provided thirty-five pre-printed self-adhesive labels 24, some of which are illustrated in FIG. 3, to be applied by the patient or user to the food exchange cards 10 in accordance with a predetermined diet prescribed by a physician. The thirty-five labels 24 would consist of seven BREAKFAST labels 30, ten LUNCH labels 40, fifteen DINNER labels 50, and three SNACK labels 60. Such labels would be supplied in the kit mounted on a backing sheet 70 for easy removal therefrom.

The kit of components would also preferably include fourteen blank self-adhesive labels 26 to be marked by the user or patient with special instructions, if any, for example "½ exchange", and for use in applying to an appropriate food exchange card 10 in accordance with the prescribed diet.

The kit of components and method in accordance with the present invention would preferably include an instruction sheet which would read as follows:

FOOD EXCHANGES KIT

Instructions

The cards are meant to be used as a teaching tool for those who must learn and adhere to a dietary regime, using food exchange lists, such as in diabetes or weight control programs.

Each card represents one food exchange and is color co-ordinated to match the colors of the various food groups found in the American Diabetic Association booklet, *EXCHANGE LISTS FOR MEAL PLANNING*. For example: BLUE-milk; GREEN-Vegetables; ORANGE-Fruit; BROWN-Bread; YELLOW-Fat; RED-Meat. However, use of this kit is not limited to American Diabetic Association exchange lists booklet and may be used with any food exchange list.

How to use:

1. To the face of each card, apply the labels marked "Breakfast", "Lunch", "Dinner", "Snack" according to your particular diet plan. For example: If you are allowed (1) fruit, (1) milk, (2) bread, (2) fat, (1) meat for breakfast, apply the label, BREAKFAST on each of these exchange cards. Follow the same directions for LUNCH, DINNER and SNACK cards. You may apply an extra label if needed, to write special instructions, i.e., "½ exchange" ... etc. Labels can be removed and re-applied if there is a change in your diet.

2. Separate the cards into groups putting BREAKFAST cards in one group, LUNCH cards in another group ... etc. When planning your meals, simply match the color of the card with the color of the food group in the exchange lists booklet. You may choose as many exchanges in each particular food group as you have cards for, for that meal. After your meal the cards can be set aside and used over an over, everyday in planning meals. They can be carried in pocket or purse, when eating a meal out, letting you know instantly what foods are allowed for that meal. They eliminate guess work, allowing you to know at a glance whether you have eaten all the food you're allowed.

The cards are an effective teaching tool for all ages.

To facilitate understanding of the kit of components and the method of implementing and adhering to a predetermined diet in accordance with the present invention, a specific example of a particular diet prescribed by a physician will be discussed hereinbelow in connection with its use of the kit of components and the method of the present invention.

For example, a particular diabetic patient may receive the following 1500 calorie ADA diet prescribed by the patient's physician. The prescribed diet specifies that the patient is permitted to have a total of 2 food exchanges per day of milk, with 1 milk exchange at breakfast and a second milk exchange as a snack; 2 total food exchanges per day of vegetables, with 1 such food exchange occurring at lunch and the second food exchange occurring at dinner; 3 food exchanges per day of fruit, with 1 such fruit food exchange occurring at breakfast, 1 at lunch, and 1 at dinner; 6½ food exchanges per day of bread, with 1 such food exchange occurring at breakfast, 2 break exchanges at lunch, 3 bread exchanges at dinner, and ½ bread exchange occurring as a snack; 4 food exchanges per day of fat, with 1 such food exchange occurring at breakfast, another at lunch, and 2 such food exchanges at dinner; and 6 food exchanges per day of meat, with 1 such food exchange occurring at breakfast, 2 food exchanges at lunch, and 3 at dinner.

The foregoing prescribed diet and distribution of food exchanges is prescribed by the physician and is given to the diabetic patient as his or her individualized 1500 calorie ADA diet.

Figure 2:
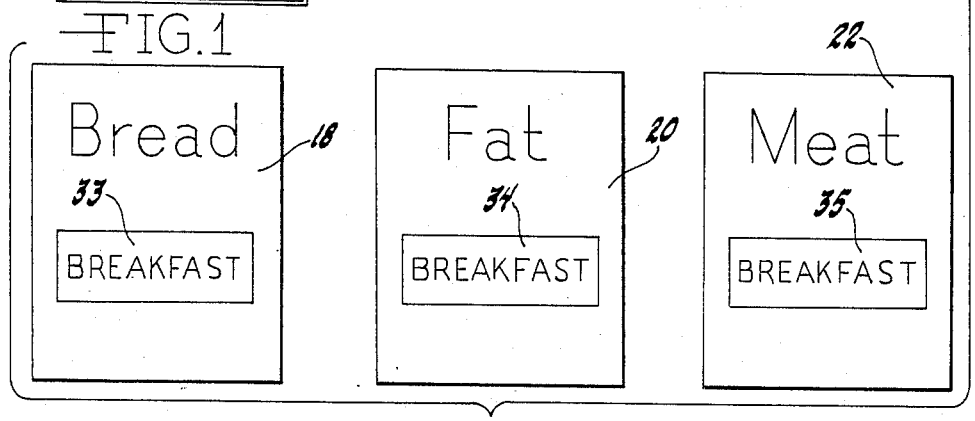
FIG. 2 illustrates 5 typical food exchange cards having pre-printed self-adhesive BREAKFAST labels affixed thereto.

To implement this prescribed diet with use of the present invention, the patient would open the kit of components and spread out the food exchange cards 10 before him or her. With reference to FIG. 2, the user would apply a pre-printed self-adhesive BREAKFAST label 31 to a blue food exchange card 14 marked MILK. The user would also apply a pre-printed self-adhesive BREAKFAST label 32 to an orange food exchange card 16 marked FRUIT; a pre-printed self-adhesive BREAKFAST label 33 to a brown food exchange card 18 marked BREAD; a pre-printed self-adhesive BREAKFAST label 34 to a yellow food exchange card marked FAT; and a pre-printed self-adhesive BREAKFAST label 35 to a red food exchange card 22 marked MEAT. Thus, FIG. 2 illustrates the particular food exchange cards and labels utilized for the breakfast meal by the patient for implementing and adhering the prescribed diet mentioned in the example hereinabove.

Similarly, the patient would apply a LUNCH label to a vegetable food exchange card, a LUNCH label to a fruit food exchange card, a LUNCH label to each of two brown (or bread) food exchange cards, a LUNCH label to a fat food exchange card, and a LUNCH label to each of two meat food exchange cards, in accordance with the 1500 calorie ADA diet mentioned hereinabove.

The patient would also apply a DINNER label to a vegetable food exchange card, a DINNER label to a fruit food exchange card, a DINNER to three bread food exchange cards, a DINNER label to two fat food exchange cards, and a DINNER label to three meat food exchange cards, in accordance with the mentioned exemplary ADA diet.

The patient would also apply a SNACK label 60 to a milk food exchange card, a SNACK label to a bread food exchange card, and would apply a blank label 80 to the bread food exchange card and write on such blank label "½ EX" to indicate that only a ½ food exchange is allowed for such snack.

As alluded to in the instruction sheet quoted hereinabove, the patient would then separate the food exchange cards 10 into groups putting BREAKFAT cards in one group, LUNCH cards in another group, etc. When a patient is planning his or her meals, he or she would simply match the color of the food exchange card 10 with the color of the food group in the exchange lists booklet. The patient is permitted to choose as many exchanges in each particular food group as he or she has cards for, for that meal. After each meal, the card can be set aside and used over and over, each day in planning meals. The cards 10 can be carried in pocket or purse, when eating a meal out, to let the patient know instantly what foods are allowed for that particular meal. The present invention with its kit of components and methods eliminates all guess work for the patient and/or dieter, and allows the patient to known at a glance whether the patient has eaten all the foods he or she has been allowed.

In accordance with the present invention, each food exchange card 10 represents one food exchange. After the patient has applied the appropriate labels 30, 40, 50, 60 and/or 80 to the prescribed food exchange cards 10, all cards in accordance with diet prescribed by the physician must be used when planning meals. All foods which each card represents must be eaten at the particular meal designated and at no other time. No foods are permitted to the "skipped".

Each ADA diet is individualized by the prescribing physician for the particular patient. Thus, with use of the method of the present invention and the novel kit of components, each exchange kit is individualized by the prescribing physician and the patient to a particular diet to fit the needs of the particular patient. For example, there are several different 1500 calorie ADA diets, each having a different distribution of foods other than the distribution specified hereinabove in connection with the explained example, making it necessary to individualize the food exchange cards.

While the present invention has been described in connection with a preferred embodiment, it is not to be limited to the foregoing description, because many variations thereof may be evident to one skilled in the art and are intended to be encompassed in the present invention as set forth in the following claims.

I claim:

1. A method of implementing and adhering to a predetermined diet, comprising the steps of:
   (a) applying a pre-printed self-adhesive BREAKFAST label to a first predetermined number of food exchange cards representing predetermined major food groups in accordance with said predetermined diet;
   (b) applying a pre-printed self-adhesive LUNCH label to a second predetermined number of food exchange cards representing predetermined major food groups in accordance with said predetermined diet;
   (c) applying a pre-printed self-adhesive DINNER label to a third predetermined number of food exchange cards representing predetermined major food groups in accordance with said predetermined diet;
   (d) assembling into a first group all of said food exchange cards to which has been applied a BREAKFAST label;
   (e) assembling into a second group all of said food exchange cards to which has been applied a LUNCH label;
   (f) assembling into a third group all of said food exchange cards to which has been applied a DINNER label;
   (g) planning a complete breakfast meal by matching each said food exchange card to which has been applied a BREAKFAST label with foods corresponding to the particular food group of each such food exchange card appearing in a food exchange lists booklet;
   (h) planning a complete LUNCH meal by matching each said food exchange card to which has been applied a LUNCH label with foods corresponding to the particular food group of each such food exchange card appearing in a food exchange lists booklet; and
   (i) planning a complete DINNER meal by matching each said food exchange card to which has been applied a DINNER label with foods corresponding to the particular food group of each such food exchange card appearing in a food exchange lists booklet.

2. A method according to claim 1, wherein:
said food exchange cards are color co-ordinated to match the colors of the various food groups found in a food exchange list; and
planning said complete breakfast, lunch and dinner meals by simply matching the color of the food exchange cards with the color of the food group in said food exchange list.

3. A method according to claim 2, including the steps of:
applying a pre-printed self-adhesive SNACK label to a fourth predetermined number of food exchange cards representing predetermined number of food exchange cards representing predetermined major food groups in accordance with said predetermined diet;
assembling into a fourth group all said food exchange cards to which has been applied a SNACK label; and
planning a snack meal by matching the food groups corresponding to the food exchange cards to which the SNACK label has been applied with corresponding food groups in said food exchange lists booklet.

4. A method according to claim 1, wherein:
each said food exchange card represents one food exchange and is color co-ordinated to match the colors of the various foods in each particular food group found in the American Diabetic Association booklet entitled EXCHANGE LISTS FOR MEAL PLANNING; and
including the step of when planning meals matching the color of each food exchange card with the color of the food in the various food groups in said booklet.

5. A method according to claim 4, including the step of:
applying a blank self-adhesive label to a fifth predetermined number of food exchange cards representing predetermined major food groups in accordance with said predetermined diet, and on each such applied blank label marking special instructions.

6. A method according to claim 3, including the step of:
applying a blank self-adhesive label to a fifth predetermined number of food exchange cards representing predetermined major food groups in accordance with said predetermined diet, and on each such applied blank label marking special instructions.

7. A method according to claim 2, wherein:
each said food exchange card represents one food exchange and is color co-ordinated to match the colors of the various foods in each particular food group found in the American Diabetic Association booklet entitled EXCHANGE LISTS FOR MEAL PLANNING; and
including the step of when planning meals matching the color of each food exchange card with the color of the food in the various food groups in said booklet.

8. A method according to claim 2, including the step of:
applying a blank self-adhesive label to a fifth predetermined number of food exchange cards representing predetermined major food groups in accordance with said predetermined diet, and on each such applied blank label marking special instructions.

9. A method according to claim 1, including the steps of:
applying a pre-printed self-adhesive SNACK label to a fourth predetermined number of food exchange cards representing predetermined major food groups in accordance with said predetermined diet;
assembling into a fourth group all said food exchange cards to which has been applied a SNACK label; and
planning a snack meal by matching the food groups corresponding to the food exchange cards to which the SNACK label has been applied with corresponding food groups in said food exchange lists booklet.

10. A method according to claim 9, wherein:
each said food exchange card represents one food exchange and is color co-ordinated to match the colors of the various foods in each particular food group found in the American Diabetic Association booklet entitled EXCHANGE LISTS FOR MEAL PLANNING; and
including the step of when planning meals matching the color of each food exchange card with the color of the food in the various food groups in said booklet.

11. A method according to claim 3, wherein:
each said food exchange card represents one food exchange and is color co-ordinated to match the colors of the various foods in each particular food group found in the American Diabetic Association booklet entitled EXCHANGE LISTS FOR MEAL PLANNING; and
including the step of when planning meals matching the color of each food exchange card with the color of the food in the various food groups in said booklet.

12. A method according to claim 1, including the step of:
applying a blank self-adhesive label to a fifth predetermined number of food exchange cards representing predetermined major food groups in accordance with said predetermined diet, and on each such applied blank label marking special instructions.

13. A kit of components for facilitating implementation of and adherence to a predetermined diet, comprising:
a first plurality of cards each of which represents one food exchange in a particular one of a major food group;
a second plurality of pre-printed self-adhesive labels corresponding to various complete meals for application to certain ones of said first plurality of food exchange cards in accordance with said predetermined diet;
a third plurality of blank self-adhesive labels to be marked by the user with special instructions for application to certain ones of said first plurality of food exchange cards in accordance with said predetermined diet;
said pre-printed self-adhesive labels provide a plurality of labels marked with names corresponding to each of the various complete meals; and
said plurality of food exchange cards are fabricated from a stiff material to facilitate application, removal, and re-application thereto of said pre-printed self-adhesive labels and/or said blank self-adhesive labels.

14. A kit of components according to claim 13, wherein:
said plurality of food exchange cards are color co-ordinated to match internationally recognized colors of the major food groups.

15. A kit of components according to claim 14, wherein:
said plurality of food exchange cards are dimensioned to fit within a man's shirt pocket.

16. A kit of components according to claim 13, wherein:
said plurality of food exchange cards are dimensioned to fit within a man's shirt pocket.

17. A kit of components for facilitating implementation of an adherence to a predetermined diet, comprising:
a first plurality of cards each of which represents one food exchange in a particular one of a major food group;
a second plurality of pre-printed self-adhesive labels corresponding to various complete meals for application to certain ones of said first plurality of food exchange cards in accordance with said predetermined diet;
a third plurality of blank self-adhesive labels to be marked by the user with special instructions for application to certain ones of said plurality of food exchange cards in accordance with said predetermined diet;
said pre-printed self-adhesive labels provide a plurality of labels marked BREAKFAST, a plurality of labels marked LUNCH, a plurality of labels marked DINNER, and a plurality of labels marked SNACK; and
said plurality of food exchange cards are fabricated from a stiff material to facilitate application, removal, and re-application thereto of said pre-printed self-adhesive labels and/or said blank self-adhesive labels.

18. A kit of components according to claim 17, wherein:
said plurality of food exchange cards are dimensioned to fit within a man's shirt pocket.

19. A kit of components for facilitating implementation of and adherence to a predetermined diet, comprising:
a first plurality of cards each of which represents one food exchange in a particular one of a major food group;
a second plurality of pre-printed self-adhesive labels corresponding to various complete meals for application to certain ones of said first plurality of food exchange cards in accordance with said predetermined diet;
a third plurality of blank self-adhesive labels to be marked by the user with special instructions for application to certain ones of said first plurality of food exchange cards in accordance with said predetermined diet;
said plurality of food exchange cards are color coordinated to match internationally recognized colors of the major food groups;
said pre-printed self-adhesive labels provide a plurality of labels marked BREAKFAST, a plurality of labels marked LUNCH, a plurality of labels marked DINNER and a plurality of labels marked SNACK; and said plurality of food exchange cards are fabricated from a stiff material to facilitate application, removal, and re-application thereto of said preprinted self-adhesive labels and/or said blank self-adhesive labels.

20. A kit of components according to claim 19, wherein:

said plurality of food exchange cards are dimensioned to fit within a man's shirt pocket.

* * * * *